(12) United States Patent
Andrews

(10) Patent No.: US 8,011,725 B2
(45) Date of Patent: Sep. 6, 2011

(54) BICYCLE RIDER SEAT BRACE

(76) Inventor: Kenneth Scott Andrews, Mooresville, NC (US)

(*) Notice: Subject to any disclaimer, the term of this patent is extended or adjusted under 35 U.S.C. 154(b) by 229 days.

(21) Appl. No.: 12/470,861

(22) Filed: May 22, 2009

(65) Prior Publication Data

US 2009/0236822 A1 Sep. 24, 2009

(51) Int. Cl.
B62J 1/00 (2006.01)
B62J 1/08 (2006.01)

(52) U.S. Cl. ............ 297/215.12; 297/215.1; 297/215.11
(58) Field of Classification Search ............... 297/215.1, 297/215.11, 215.12
See application file for complete search history.

(56) References Cited

U.S. PATENT DOCUMENTS

| 364,075 | A | 5/1887 | Williamson |
|---|---|---|---|
| 524,753 | A | 8/1894 | Boyd |
| 553,722 | A | 1/1896 | Prall |
| 592,783 | A | 11/1897 | Hess |
| 620,688 | A | 3/1899 | Wood |
| 636,222 | A | 10/1899 | Killen |
| 1,146,676 | A | 7/1915 | Weed |
| 4,363,516 | A | 12/1982 | Braly et al. |
| 4,475,770 | A | 10/1984 | Persons, II |
| 4,909,522 | A | 3/1990 | Flanigan |
| 4,978,167 | A | 12/1990 | Harvey |
| 5,501,476 | A | 3/1996 | Howell et al. |
| 5,887,943 | A | 3/1999 | Lee |
| 6,189,908 | B1 * | 2/2001 | Lu .................. 297/215.11 X |
| 6,206,399 | B1 | 3/2001 | Schnitzenbaumer |
| 6,527,291 | B1 | 3/2003 | Hurtig |
| 7,226,065 | B2 | 6/2007 | Hutson |
| 2005/0046246 | A1 * | 3/2005 | Shiau ................ 297/215.11 |
| 2006/0237946 | A1 * | 10/2006 | Hutson ............. 297/215.12 X |
| 2008/0296864 | A1 | 12/2008 | Hutson |

* cited by examiner

Primary Examiner — Rodney B White
(74) Attorney, Agent, or Firm — Oliff & Berridge, PLC

(57) ABSTRACT

A bicycle rider seat brace for maintaining the buttocks of a bicycle rider in a stationary position on a racing bicycle seat during seated pedaling includes an elongate member for being attached to the bicycle at a position below the bicycle seat and having a rearwardly extending end positioned behind the bicycle seat, and a bracing element carried by the rearwardly extending end of the elongate member and positioned proximate a rearward most portion of the seat for engaging a central part of the buttocks of the rider and preventing the buttocks from moving rearwardly past the bracing element.

16 Claims, 5 Drawing Sheets

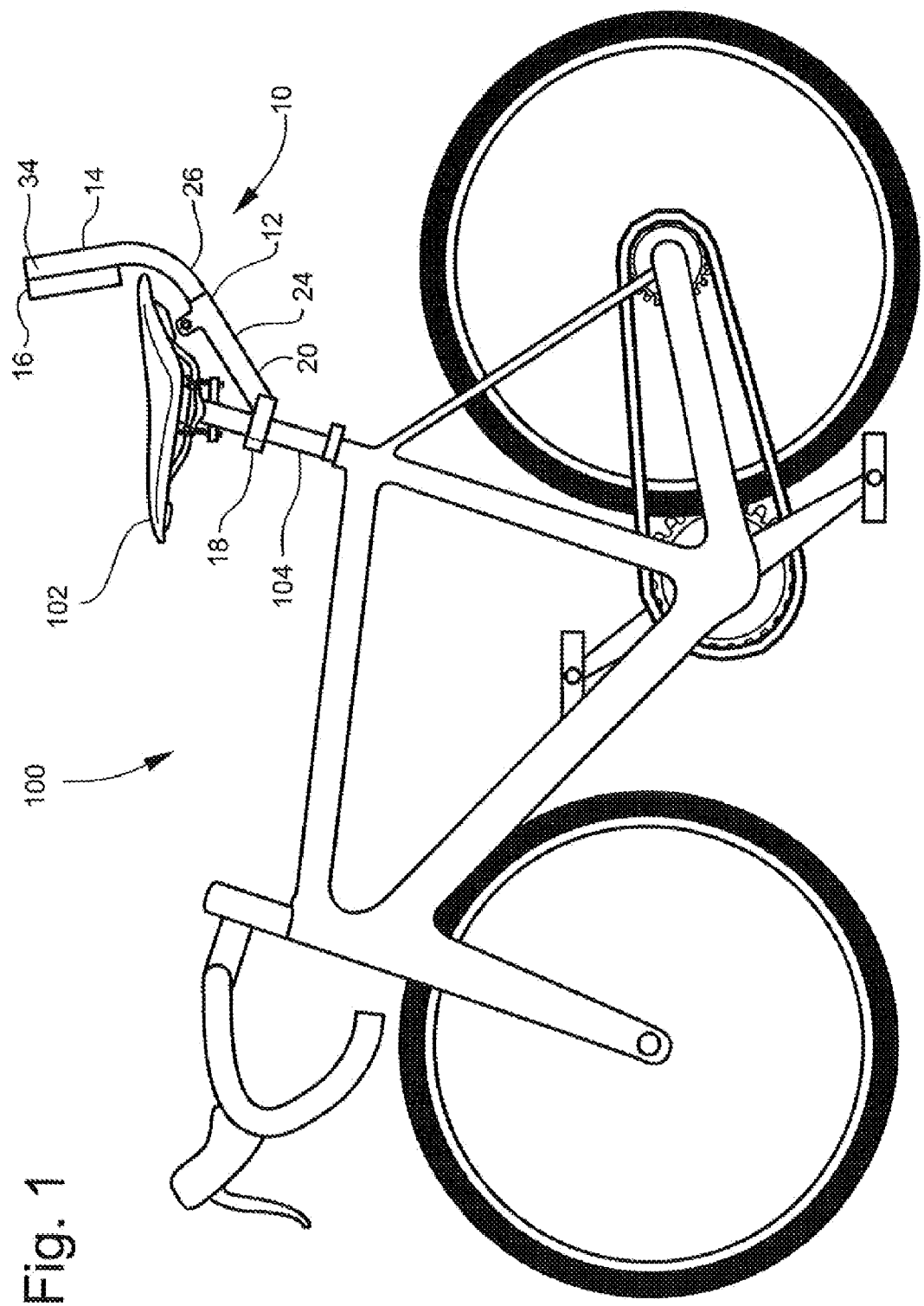

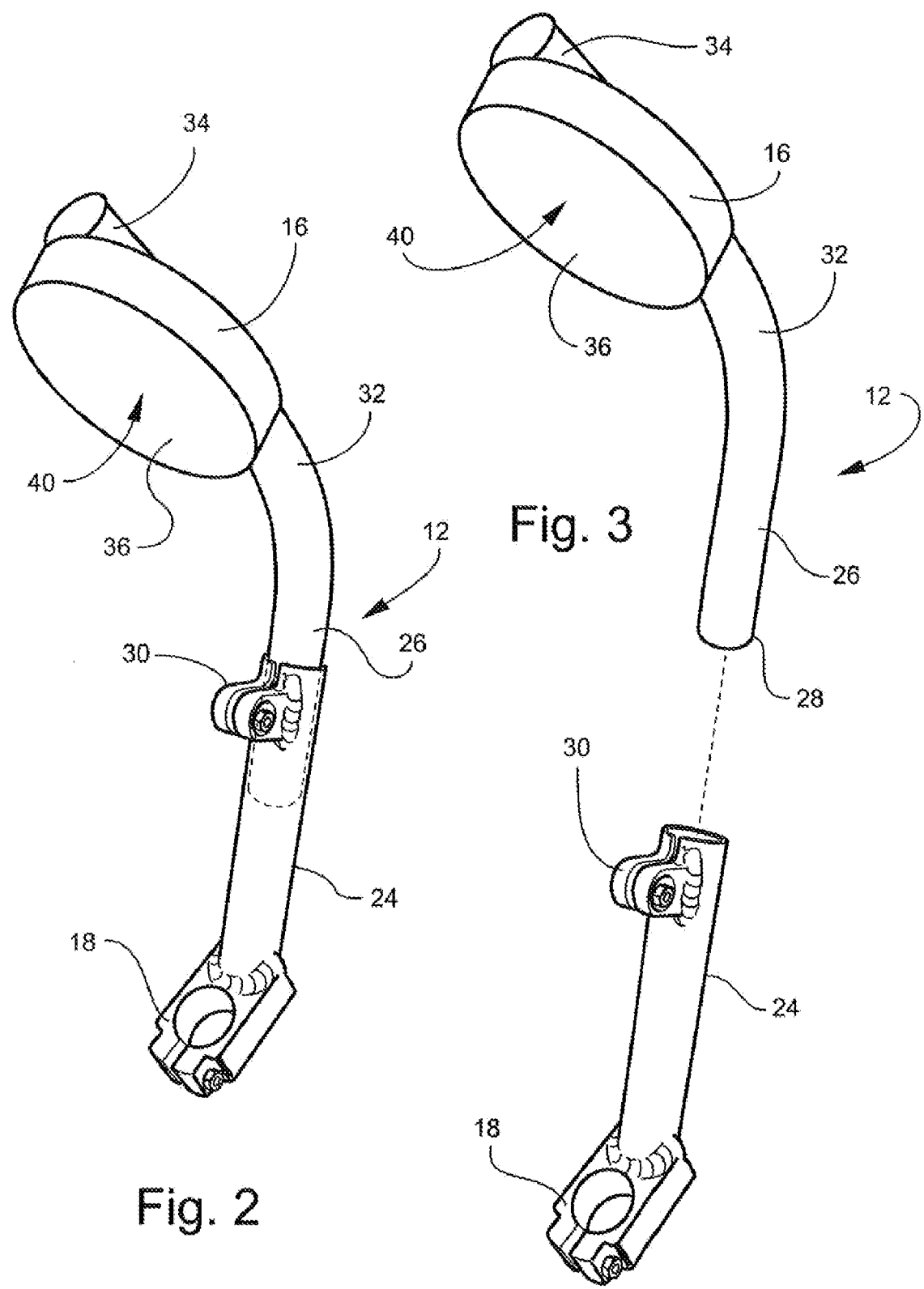

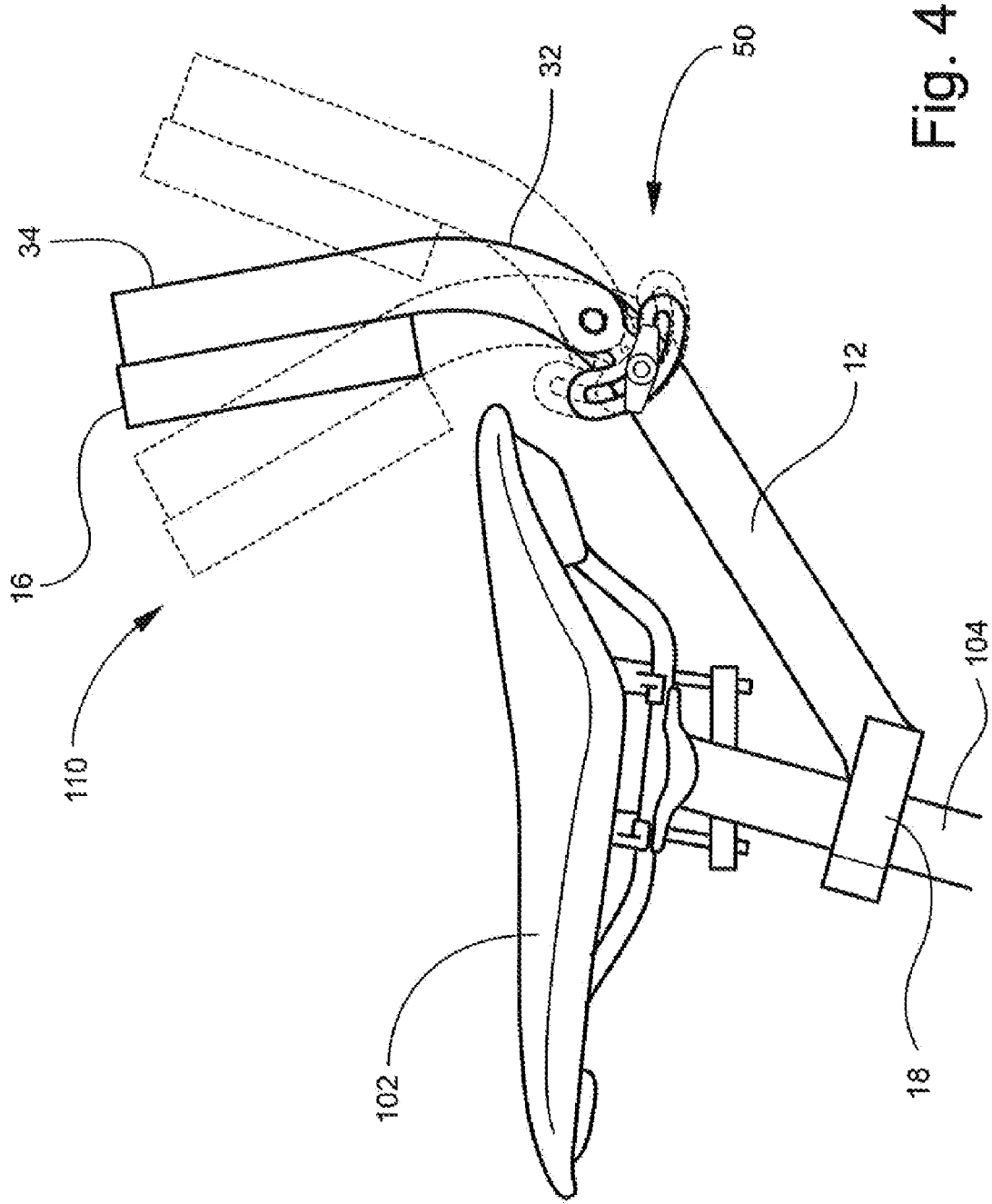

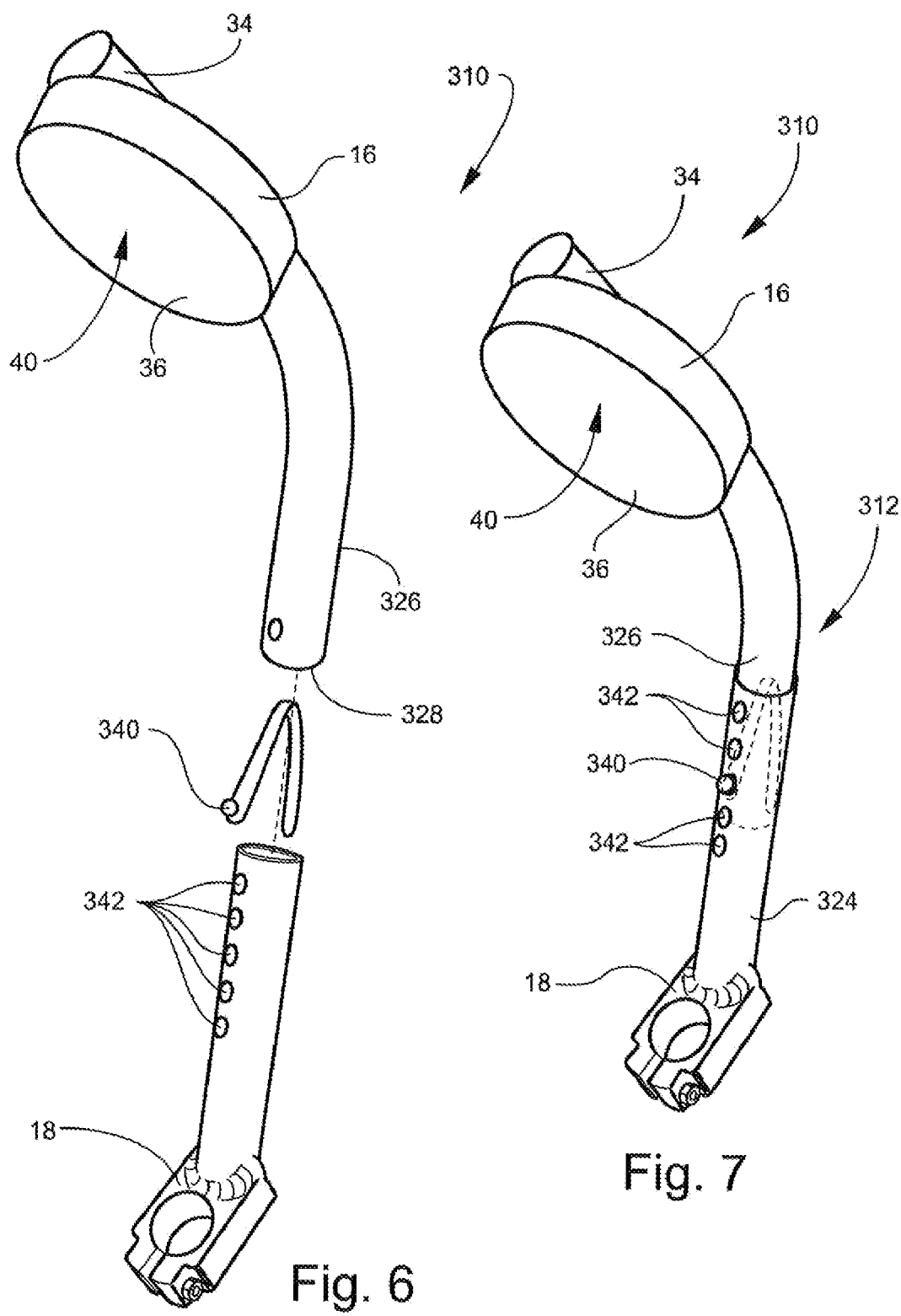

BICYCLE RIDER SEAT BRACE

TECHNICAL FIELD OF THE INVENTION

This invention relates generally to a bicycling accessory, and more particularly to a seat brace for maintaining the position of a rider during seated pedaling.

BACKGROUND OF THE INVENTION

While bicyclists competing and training at velodrome facilities and dedicated tracks may enjoy fixed riding conditions, those same riders and others may experience or even prefer a wide variety of conditions such as steep and varying grades, inconsistently banked turns, and the many other challenging and unique features found along riding and racing courses that are selected from existing geographies and roadways. Thus, while the perfection of riding form and posture upon a bicycle can be achieved at a specialized riding facility or on a stationary training bike, riders who follow or design their own courses across both urban and rural landscapes find their attentions drawn to the realities of traffic, other riders, and imperfect course conditions. Especially where irregular uphill and downhill grades are present along a riding course, bicyclists find themselves shifting about on their saddles, lifting themselves from their saddles, and generally leaning and moving about over their bikes.

Some bicyclists particularly experience shifting rearward on their saddles and the need to pull on their handlebars to prevent such shifting. Undesired strains are therefore experienced in their hands and lower backs, and their shifting riding positions compromise their efficiencies and performances.

Whether or not a bicyclist is aware of adverse affects such as rearward shifting or handlebar clenching, riders and bike makers may have long neglected to provide innovations for improving power transfer from the body of a rider to the pedals of a bike. Improvements in seating accessories or seats themselves for increasing pedaling forces and efficiencies are not readily apparent on the market.

BRIEF SUMMARY OF THE INVENTION

Accordingly, it is an object of the present invention to provide a seat brace for maintaining the buttocks of a bicycle rider in a stationary position on a racing bicycle seat during seated pedaling. A preferred embodiment of the seat brace includes an elongate member for being attached to the bicycle at a position below the bicycle seat and having a rearwardly extending end positioned behind the bicycle seat, and a bracing element carried by the rearwardly extending end of the elongate member and positioned proximate a rearward most portion of the seat for engaging a central part of the buttocks of the rider and preventing the buttocks from moving rearwardly past the bracing element.

In at least one example, the seat is mounted on an upwardly-extending tube and the elongate member is mounted on the tube.

In at least one example, the elongate member includes a first portion for being attached to the bicycle and a second portion that telescopically attaches to the first portion for adjustment of the bracing element with respect to the buttocks. In that example, the seat brace includes a pin for fixing the telescopic attachment of the first portion of the elongate member to the second portion, and the second portion has a forwardly extending end adjustably extending into the first portion.

In at least one example, the bracing element includes a forwardly facing bracing pad carried by the elongate member for engaging the central part of the buttocks of the rider. In that example, the elongate member includes an elbow portion and an upwardly extending portion attached to the bracing pad. The elbow portion and the upwardly extending portion may be integrally formed from a single tubular piece of material. The position of the bracing pad may be vertically adjustable with respect to the upwardly extending portion of the elongate member for positioning the bracing pad to engage the central part of the buttocks of the rider. In at least one example, the bracing pad is circular and has a diameter of approximately 4 inches. A cushion layer removably attached to the bracing pad may be provided.

In at least one example, the elongate member is constructed of a material selected from a set of materials that consists of aluminum, aluminum alloy, titanium, and carbon fiber.

The elongate member may include a clamp for adjustably attaching the elongate member to the bicycle. The elongate member may include a forwardly extending end in a horizontal position for being attached to the bottom of the bicycle seat. The forwardly extending end of the elongate member may be horizontally adjustable with respect to the bottom of the bicycle seat for positioning the bracing element to engage the central part of the buttocks of the rider. In at least one example, the elongate member indexes to predetermined positions with respect to the bicycle seat for positioning the bracing element into predetermined positions, and a pin is provided for releasably fixing the elongate member into a predetermined position with respect to the bicycle seat.

BRIEF DESCRIPTION OF THE DRAWINGS

The subject matter that is regarded as the invention may be best understood by reference to the following description taken in conjunction with the accompanying drawing figures in which:

FIG. 1 is a side elevation view of a seat brace according to at least one embodiment of the invention mounted upon a bicycle;

FIG. 2 is a perspective view of the seat brace of FIG. 1, dismounted from the bicycle;

FIG. 3 is an exploded perspective view of the seat brace of FIG. 2;

FIG. 4 is a side elevation view of a seat brace according to at least one other embodiment of the invention mounted upon the seat post of a bicycle;

FIG. 6 is an exploded perspective view of a seat brace according to a preferred embodiment of the invention; and FIG. 7 is an assembled perspective view of the seat brace of FIG. 6.

DETAILED DESCRIPTION OF THE INVENTION

Figure 5:
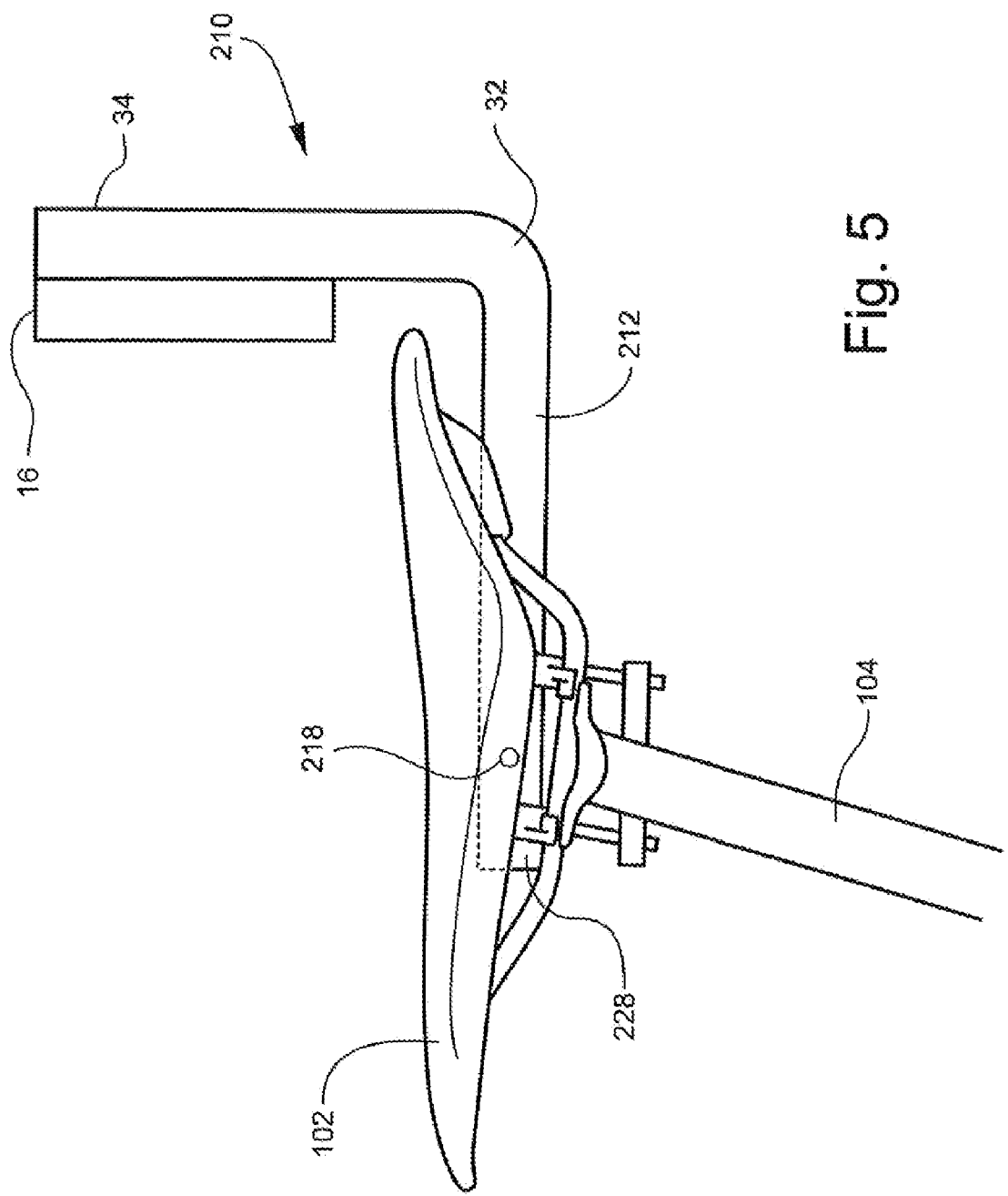
FIG. 5 is a side elevation view of a seat brace according to yet another embodiment of the invention mounted upon a bicycle seat.

Referring to the drawings wherein identical reference numerals denote the same elements throughout the various views, a bicycle rider seat brace 10 according to at least one embodiment of the present invention is shown mounted on a bicycle 100 in FIG. 1. As further shown in FIGS. 2 and 3, the seat brace 10 includes an elongate member 12 for being attached to the bicycle 100 at a position below a bicycle seat 102 as shown in FIG. 1. The elongate member 12 has a rearwardly extending end 14 positioned behind the bicycle seat. 102. The seat brace 10 includes a bracing element 16 carried by the rearwardly extending end 14 of the elongate member 12.

A clamp 18 attached to the forwardly extending end 20 of the elongate member 12 adjustably grips the upwardly-extending tube 104 upon which the seat 102 is mounted. The clamp 18 is loosened to permit adjustment of the overall position of the seat brace 10 along the tube 104 and tightened to fix the seat brace 10 to the bicycle 10 at a selected position.

In the embodiment shown in FIGS. 1-3, the elongate member 12 has a first portion 24 attached to the clamp 18 for attaching the seat brace 10 to the bicycle and a second portion 26 that telescopically attaches to the first portion 24 to permit adjustment of the bracing element 16 relative to the buttocks of a rider seated on the bicycle seat 102. The bracing element 16 is properly adjusted when positioned proximate a rearward most portion of the seat 102 for engaging a central part of the buttocks of the rider and preventing the buttocks from moving rearwardly past the bracing element.

The second portion 26 of the elongate member 12 has a forwardly extending end 28 (FIG. 3) that adjustably extends into the first portion 24. A clamp 30 fixes the telescopic attachment of the first portion 24 of the elongate member 12 to the second portion 26. The second portion 26 of the elongate member 12 furthermore has an elbow portion 32 and an upwardly extending portion 34 attached to the bracing element 16. In the embodiment illustrated in FIGS. 1-3, the second portion 26 of the elongate member 12, including the forwardly extending end 28, the elbow portion 32, and the upwardly extending portion 34, is formed from a single tubular piece of material.

In the illustrated embodiment of the seat brace 101 the first and second portions 24 and 26 of the elongate member 12 are formed as lower and upper round tubes, respectively, made of aluminum. The lower tube 24, which is 6 inches long, has an outer diameter of 1.0 inch and a wall thickness of 0.065 inch. The upper tube 26, which is 12 inches long between its forwardly extending end 28 and its upwardly extending portion 34, has an outer diameter of 0.875 inch and a wall thickness of 0.065 inch. The lower tube 24 is welded to the clamps 18 and 30 at opposing ends thereof. All of the dimensions recited in these descriptions are provided as unlimiting examples and are approximate. These descriptions relate to other exemplary dimensions without further express recitations.

Furthermore, although aluminum has been recited as an exemplary material of which the elongate member 12 may be formed, these descriptions relate as well to other materials having strength and weight characteristics that may be preferred in particular embodiments of the seat brace 10. For example, the elongate member may include aluminum, aluminum alloy, titanium, and carbon fiber.

The bracing element 16 has a forward-facing bracing pad 36 carried by the elongate member 12 for engaging the central part of the buttocks of a rider. In the illustrated example, the bracing pad 36 is circular and has a diameter of approximately 4.0 inches. The bracing pad 36 may be constructed of plastic or other selected material. In at least one embodiment, the bracing pad 16 is vertically adjustable with respect to the upwardly extending portion 34 for positioning the bracing pad 36 to engage the central part of the buttocks of a seated rider. The bracing element 16 may also be pivotally adjustable with respect to the upwardly extending portion 34 to permit the position of the bracing pad 36 to flatly contact the seated rider. The bracing element 16 includes a cushion layer 40 removably attached to the bracing pad 36 by hook and loop fastening fabric to comfort the rider upon pressing the buttocks against the bracing element.

In an alternate embodiment of a seat brace 110, which is illustrated in FIG. 4, a pivoting joint 50 is provided at the elbow portion 32. The upwardly extending portion 34 and the bracing element 16 carried therewith are pivotally adjustable about the pivoting joint 50 to permit adjustment of the bracing element 16 relative to the buttocks of a rider seated on the bicycle seat 102. The pivoting joint 50 indexes to predetermined positions and fixes at those positions to assure stability. This also permits a rider to identify a preferred predetermined position and to return the pivoting joint 50 to the preferred position when needed or after use by another rider.

In an alternate embodiment of a seat brace 210, which is illustrated in FIG. 5, the elongate member 212 is in a horizontal position and has a forwardly extending end 228 that attaches to the bottom of the bicycle seat 102. The elongate member 212 is horizontally adjustable with respect to the bottom of the bicycle seat for positioning the bracing element 16 to engage the central part of the buttocks of a seated rider. The elongate member 212 indexes to predetermined positions with respect to the bicycle seat for positioning the bracing element 16 into predetermined positions. A pin 218 releasably fixes the elongate member 212 into a selected predetermined position with respect to the bicycle seat once a preferred position is found by the rider.

In a preferred embodiment of a seat brace 310, which is illustrated in FIGS. 6 and 7, an elongate member 312 includes a first portion 324 and a second portion 326 having a forwardly extending end 328 (FIG. 6) that adjustably extends into the first portion 324 to define a telescopic attachment. A pin 340 fixes the telescopic attachment of the first portion 324 of the elongate member 312 to the second portion 326. In the illustrated embodiment, the first portion 324 has multiple holes 342 for receiving the pin 340 to define predetermined positions of the second portion 326 with respect to the first portion 324. The pin 340 is carried by the second portion 326 and is movably biased outwardly therefrom to be received in a selected hole 342, for example as shown in FIG. 7, to fix the second portion 326 in a preferred position with respect to the first portion 324 according to the preference and comfort of a rider.

Each embodiment illustrated in FIGS. 1-5 facilitates power delivery by a seated bicycle rider by providing the bracing element 16 upon which a rider presses to then apply more force to the pedals of the bike while maintaining a preferred seat position. Riding efficiency is improved on all geographies such as flats, rolling hills, and steep hills and on all terrains making the seat braces 10, 110 and 210 and variants thereof within the scope of these descriptions useful for on-road and off-road bicycling. A bicyclist can press against the the bracing element 16 to increase the power delivered to the pedals while the rider's buttocks are maintained in a stationary position on the seat 102 without pulling on the handlebars of the bike. The bracing element 16 provides equal and opposite forces against those applied to the pedals so that the rider can relax the hands and focus on pedalling with reduced strain on the lower back of the rider. By positioning the central part of the buttocks into contact with the bracing element 16, the favored position of the rider upon the seat can be quickly assumed when a rider mounts the bike or when the rider resumes a seated position after standing on the pedals.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A bicycle rider seat brace for maintaining the buttocks of a bicycle rider in a stationary position on a racing bicycle seat during seated pedaling, comprising:
   (a) an elongate member for being attached to the bicycle at a position below the bicycle seat and having a rearwardly extending end positioned behind the bicycle seat; and
   (b) a bracing element carried by the rearwardly extending end of the elongate member and positioned proximate a rearward most portion of the seat for engaging a central part of the buttocks of the rider and preventing the buttocks from moving rearwardly past the bracing element;
   wherein the elongate member comprises a first portion for being attached to the bicycle and a second portion that telescopically attaches to the first portion for adjustment of the bracing element with respect to the buttocks;
   wherein a pin fixes the telescopic attachment of the first portion to the second portion;
   wherein the second portion has a forwardly extending end adjustable relative to the first portion; and
   wherein one of the first and second portions has multiple holes for receiving the pin to define predetermined positions of the second portion with respect to the first portion.

2. A seat brace according to claim 1, wherein the seat is mounted on an upwardly-extending tube and the elongate member is mounted on the tube.

3. A seat brace according to claim 1, wherein the pin is carried by the second portion and is movably biased outwardly therefrom.

4. A seat brace according to claim 1, wherein the bracing element comprises a forwardly facing bracing pad carried by the elongate member for engaging the central part of the buttocks of the rider.

5. A seat brace according to claim 4, wherein the elongate member comprises an elbow portion and an upwardly extending portion attached to the bracing pad.

6. A seat brace according to claim 5, wherein the elbow portion and the upwardly extending portion are integrally formed from a single tubular piece of material.

7. A seat brace according to claim 4, wherein the position of the bracing pad is vertically adjustable with respect to the upwardly extending portion of the elongate member for positioning the bracing pad to engage the central part of the buttocks of the rider.

8. A seat brace according to claim 4, wherein the bracing pad is circular.

9. A seat brace according to claim 8, wherein the bracing pad has a diameter of approximately 4 inches.

10. A seat brace according to claim 4, further comprising a cushion layer removably attached to the bracing pad.

11. A seat brace according to claim 1, wherein the elongate member comprises a material selected from a set of materials that consists of aluminum, aluminum alloy, titanium, and carbon fiber.

12. A seat brace according to claim 1, wherein the elongate member comprises a clamp for adjustably attaching the elongate member to the bicycle.

13. A seat brace according to claim 1, wherein the elongate member comprises a forwardly extending end in a horizontal position for being attached to the bottom of the bicycle seat.

14. A seat brace according to claim 13, wherein the elongate member is horizontally adjustable with respect to the bottom of the bicycle seat for positioning the bracing element to engage the central part of the buttocks of the rider.

15. A seat brace according to claim 14, wherein the elongate member indexes to predetermined positions with respect to the bicycle seat for positioning the bracing element into predetermined positions.

16. A seat brace according to claim 15, further comprising a pin for releasably fixing the elongate member into a predetermined position with respect to the bicycle seat.

* * * * *